United States Patent Office 3,379,561
Patented Apr. 23, 1968

3,379,561
PROCESS OF PREPARING FILMY ADHESIVE
Kazuo Manaka, Kawasaki-shi, Japan, assignor to Tokyo Shibaura Electric Co., Ltd., Kawasaki-shi, Japan, a corporation of Japan
No Drawing. Filed Mar. 19, 1964, Ser. No. 353,233
7 Claims. (Cl. 117—122)

ABSTRACT OF THE DISCLOSURE

A process for the manufacture of an adhesive film which comprises applying a solution of an epoxy resin to a film of a polyamide resin in the presence of a phenolic resin contained in either the polyamide resin or the epoxy resin, and drying the coated film.

---

This invention relates to a process of preparing a filmy adhesive, and more particularly to a process of obtaining the filmy adhesive by coating the surface of a polyamide resin film in the presence of phenolic resin with a solution of epoxy resin.

A solid lumpy adhesive or filmy adhesive obtained by melting a mixture of a polyamide resin such as nylon and a novolak-type phenol resin was previously proposed in Japanese Patent Nos. 184,177 and 296,976. Those inventions are characterized by combining the toughness of polyamide resins and the adhesiveness of phenol resins. Since these adhesives are thermoplastic, and of the so-called hot melt type, they need no curing in use. However, the simplicity of use is offset by the natural disadvantage that the adhesive is not sufficiently resistant to heat.

The present invention has for its object elimination of this disadvantage and impartation of further thermal resistance to such adhesives, namely, by provision of a cure-type adhesive having good thermal resistance and adhesiveness through the combination of a polyamide resin and a phenol resin with an epoxy resin.

It has been known that a polyamide resin acts as a curing agent for (an epoxy resin). For instance, the polyamide resin "Versamid," which is manufactured by the condensation of polymerized unsaturated fatty acids with aliphatic amines is typical of curing agents of this kind. It has also been known that polyamide resins such as nylon have a curing effect.

Among similar polyamides having a curing effect upon an epoxy resin, nylon is not as active as "Versamid" because the former includes fewer =NH or —NH$_2$ radicals in the molecule. Further, nylon, having a higher melting point than "Versamid," must be heated to a relatively high temperature of about 250° C. to carry out curing. Further, it has also been known that the temperature should be raised higher than the melting point of the polyamide resin to promote the curing effect.

The object of the present invention is to obtain a cure-type filmy adhesive having good adhesiveness and resistance to heat in which curing is promoted by heating the adhesive to a temperature of 200° to 300° C.

It has bean found that the curing effect is remarkably increased by adding phenolic resin to a combination of polyamide resin and epoxy resin. That is, according to one experiment, pellets of 6,6-nylon, an epoxy resin (Epon 812) and a novolak-type phenol resin manufactured from phenol and formaldehyde were mixed one with another in ratios by weight as listed in the following table, and subjected to heat curing. Measurement of gelation temperature was carried out. Epon 812 is a liquid epoxy resin produced by condensation of epichlorhydrin with bisphenol A, having a viscosity of 1.0–1.7 poises and an epoxide equivalent (grams of resin containing one gram-equivalent of epoxide) of from 140 to 160.

| Experiment Run | A | B | C |
|---|---|---|---|
| 6,6-nylon pellets | 4 | 0 | 4 |
| Epon 812 | 4 | 4 | 4 |
| Novolak-type phenol resin | 0 | 1 | 1 |

Whereas compositions A and B lost fluidity at a temperature of 250° C. and underwent gelation, composition C was observed to have already undergone gelation at a temperature of 200° C. before the nylon started to melt. As compared with composition A consisting only of 6,6-nylon pellets and Epon 812, composition C, where the same composition as in A was mixed with a small amount of phenol resin, had a lower gelation temperature. This fact proves that the presence of phenol resins contributes remarkably to the curing effect.

Presumably, in this case, the so-called trimolecular concerted substitution reaction is effected wherein the =NH or —NH$_2$ radical of the polyamide resin acts to push out the epoxy radical of epoxy resin, and the —OH radical of the phenol resin acts to pull out the epoxy ring at the transition state through the formation of a hydrogen bond and thus the curing is promoted. The reaction equation will be as follows, when the amine radical of the polyamide resin is =NH.

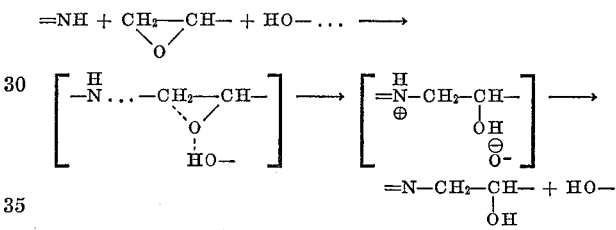

According to the present invention, the combination of a phenolic resin with a polyamide resin and an epoxy resin allows production of an adhesive more excellent than that obtained by the mere combination of a polyamide resin with an epoxy resin not only in promotion of the curing effect, but also in improved thermal resistance and adhesiveness.

More particularly, according to the present invention, placement of a phenolic resin between one or two sides of a polyamide resin film and the solution of epoxy resin can be effected by mixing the phenolic resin with the solution of polyamide resin and/or epoxy resin. In other words, a combination of resins can be effected by heating a mixture of phenol resin and polyamide resin for thorough mixing and melting. Then, a ketone solution of epoxy resin is applied to the polyamide-phenolic resin film thus obtained, and dried, or a ketone solution of a mixture of phenolic resin and epoxy resin is applied to a polyamide resin film, and dried to form a filmy adhesive.

Polyamide resins available for the process of the present invention are 6,6-nylon, 6,10-nylon, 10,6-nylon and 10,10-nylon. Of these nylons, 6,6-nylon is preferred with respect to thermal resistance because of its relatively high melting point. Aside from the above nylons, generally those polyamide resins which have such amine radicals as ≡N, =NH and —NH$_2$ in the molecule and have a film-forming ability can of course serve the purpose of the present invention. Phenolic resins such as novolak-type or resol-type resins obtained from phenol and formaldehyde can also be used. Further, a bisphenol A-formaldehyde resin obtained from bisphenol A and formaldehyde can also be used. Further, it is evident that a number of phenolic resins containing phenolic —OH radicals in the molecule can be used. Any kind of epoxy resin is suitable for use in the process of the present invention, but it is preferably convenient to use a solid resin rather than one liquid at normal temperature because of the necessity for drying the coating on the film.

Embodiment of the present invention will be illustrated in the following examples.

Example 1

A mixture of 10% novolak-type phenol resin and 90% commercially available polyhexamethylene adipamide, both by weight, was placed in an extruder and kept at a temperature of 260° C. for thorough mixing and melting of the two resins. Then, a 20% methyl ethyl ketone solution of epoxy resin Epon 1004 was applied to both surfaces of the film formed by extrusion through T-shaped dies, and the film was dried. Epon 1004 is an epoxy resin produced by condensation of epichlorhydrin with bisphenol A having a melting point of 95°–105° C. determined by Durran's mercury method, a viscosity (40% weight solution in butyl carbitol) of 4.5 to 6.6 poises and an epoxide equivalent of 875 to 1025. The nylon film before coating was 0.020 mm. thick, but was about 0.025 mm. thick after coating and drying.

This film was sandwiched between two metal plates and heated at a temperature between 200° and 300° C. with compression applied for 2 to 6 minutes. Then, the film was cured and provided good bondage of the metal plates to each other. In a similar manner, good bondage between metal and ceramics, and metal and laminated plastics may be attained.

Example 2

To a 0.020 mm.-thick nylon film was applied a 20% acetone solution consisting of a mixture of a novolak-type phenol resin and epoxy resin Epon 1004, each being in equal amount by weight, the film was dried and a film about 0.025 mm. thick was obtained. This film was used in the same manner as described in Example 1, with similar results.

Example 3

Into a flask with three openings and equipped with a reflux condenser, a thermometer and an agitator were placed 188 g. (2 moles) of phenol and 150 g. (2 moles) of 40% Formalin, and 3 cc. of 0.5 NHCl was added as the catalyst. The mixture was heated at a temperature of about 97° C. on a water bath for condensation thereof. When the reaction solution exhibited a white turbidity, 340 g. (1.3 moles) of 15% aqueous caustic soda solution was added. Then, the reaction temperature was kept at 65° C., and 186 g. (2 moles) of epichlorohydrin was added dropwise with agitation for about 30 minutes. The reaction was carried on as such for two hours. A yellow-brown viscous liquid settled and was removed. Then, the sodium chloride formed was removed by several distilled water washings. Acetone was added thereto for dissolution, and the solution was subjected to filtration. The filtrate was gently heated for evaporative removal of acetone, and a solid resin containing novolak-type resin and epoxy resin formed through epoxylation of the phenol resin was obtained. This solid resin was dissolved eight times in an equal volume of acetone, applied to a nylon film, and dried. In this manner the filmy adhesive was obtained.

Example 4

The same reaction as described in Example 3 was carried out using 0.5 N aqueous caustic soda solution as the catalyst for formation of a resol-type phenol resin. Through partial epoxylation thereof, a mixture of resol-type phenol resin and epoxy resin was obtained. An acetone solution thereof was applied to a nylon film, and a similar filmy adhesive was obtained.

Example 5

Into a flask with three openings and equipped with an agitator, a thermometer, and a reflux condenser were placed 220 g. (2 moles) of resorcinol, 37.5 g. (0.5 mole) of 40% Formalin and 180 g. of water. The mixture was heated at a temperature of 97° C. on a water bath for five hours. 680 g. (2.6 moles) of 15% aqueous caustic soda solution were added. While the reaction temperature was kept at a temperature of 65° C., 372 g. (4 moles) of epichlorohydrin was subjected to reaction in the same manner as described in Example 3. The formed sodium chloride was removed by water washing, and a mixture of resorcinol resin and epoxy resin thus obtained was dissolved in acetone, applied to the nylon film, and dried. In this manner, the filmy adhesive was obtained.

Example 6

Nine parts by weight of epoxy resin (Epon 1004) was mixed with one part of resol-type phenol resin obtained from phenol and Formalin, and dissolved in acetone. The solution was applied to a nylon film, and dried. In this manner, the filmy adhesive was obtained.

What we claim is:

1. A process for the manufacture of a filmly heat-cure type adhesive which comprises applying a solution of an epoxy resin having a terminal epoxy group represented by the formula

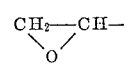

to a film of nylon resin in the presence of a phenolic resin selected from the group consisting of novolak resins, resol resins and resorcinol-formaldehyde resins, said phenolic resin being contained in one of said epoxy resin and said nylon resin and present in an amount sufficient to promote curing of said adhesive at a temperature below about 250° C., and drying the coated film.

2. A process for the manufacture of a filmly adhesive in accordance with claim 1 wherein the film is formed from a mixture of 90 weight percent of polyhexamethylene adipamide and 10 weight percent of a novolak resin, and the epoxy resin in applied as a 20 weight percent methylethyl ketone solution to both surfaces of said film.

3. A process for the manufacture of a filmy adhesive in accordance with claim 1 wherein an acetone solution of a mixture of equal amounts by weight of a novolak resin and an epoxy resin is applied to the nylon film.

4. A proces for the manufacture of a filmly adhesive in accordance with claim 1 wherein an acetone solution of a resin mixture of a novolak resin and an epoxy resin produced by subjecting 2 moles of phenol to reaction with 2 moles of formaldehyde in presence of 3 cc. of 0.5 N HCl as a catalyst and adding 1.3 moles of caustic soda and 2 moles of epichlorohydrin to the reaction product is applied to the nylon film.

5. A process for the manufacture of a filmy adhesive in accordance with claim 1 wherein an acetone solution of a mixture of a resol resin and an epoxy resin obtained by synthesizing a resol resin by reacting 2 moles of phenol with 2 moles of formaldehyde in presence of 10 cc. of 0.5 N aqueous caustic soda solution as an alkaline catalyst and partially epoxylating said resol resin by adding 1.3 moles of caustic soda and 2 moles of epichlorohydrin thereto is applied to the nylon film.

6. A process for the manufacture of a filmy adhesive in accordance with claim 1 wherein an acetone solution of a mixture of a resorcinol resin and an epoxy resin obtained by reacting 2 moles of resorcinol with 0.5 mole of formaldehyde, and adding 2.6 moles of caustic soda and 4 moles of epichlorohydrin to the resulting reaction product is applied to the nylon film.

7. A process for the manufacture of a filmy adhesive in accordance with claim 1 wherein an acetone solution of a mixture of 9 parts by weight of an epoxy resin having an epoxide equivalent of 875 to 1025 with 1 part by weight of a resol resin is applied to the nylon film.

(References on following page)

References Cited

UNITED STATES PATENTS

| | | | |
|---|---|---|---|
| 2,521,912 | 9/1950 | Greenlee | 260—59 |
| 2,683,130 | 7/1954 | D'Alelio | 260—43 |
| 2,705,223 | 3/1955 | Renfrew et al. | 260—.18 |
| 2,764,502 | 9/1956 | Emerson | 117—47 |
| 2,864,791 | 12/1958 | DeGroote et al. | 260—45 |
| 2,893,965 | 7/1959 | Greenlee | 260—19 |
| 2,903,381 | 9/1959 | Schroeder | 117—138.8 |
| 3,031,421 | 4/1962 | Boyer et al. | 260—19 |

WILLIAM D. MARTIN, *Primary Examiner.*

W. D. HERRICK, *Assistant Examiner.*